US006441305B1

(12) United States Patent
Dong

(10) Patent No.: US 6,441,305 B1
(45) Date of Patent: Aug. 27, 2002

(54) HIGH TEMPERATURE SLIP-SEALING GROMMET SYSTEMS

(75) Inventor: Wesley B. Dong, Belmont, CA (US)

(73) Assignee: Tyco Electronics Corporation, Menlo Park, CA (US)

( * ) Notice: Subject to any disclaimer, the term of this patent is extended or adjusted under 35 U.S.C. 154(b) by 0 days.

(21) Appl. No.: 09/672,385

(22) Filed: Sep. 28, 2000

(51) Int. Cl.$^7$ ................................................. H02G 3/18
(52) U.S. Cl. ................ 174/65 G; 179/135; 179/152 G; 248/56; 16/2.2
(58) Field of Search ........................... 174/65 G, 65 SS, 174/65 R, 152 G, 153 G, 135, 74 A, 77 R, 76, 82; 248/56; 16/2.1, 2.2

(56) References Cited

U.S. PATENT DOCUMENTS

| 4,847,447 A | * 7/1989 | Eiswirth et al. ........... 174/74 A |
| 4,877,943 A | * 10/1989 | Oiwa .................... 174/74 A X |
| 5,098,752 A | * 3/1992 | Chang et al. ............... 428/34.9 |
| 5,170,008 A | * 12/1992 | Evans et al. .............. 174/35 C |

FOREIGN PATENT DOCUMENTS

GB  2269945  * 2/1994  ............... 174/65 G

* cited by examiner

Primary Examiner—Dean A. Reichard
Assistant Examiner—Dhiru R Patel
(74) Attorney, Agent, or Firm—Marguerite E. Gerstner; Elizabeth A. O'Brien; Lawrence A. Chaletsky

(57) ABSTRACT

A seal kit for assembly into a system for sealing an elongate heating cable from ambient essentially includes a cone-shaped elastomeric grommet, several molded plastic parts, and a compression spring. The compression grommet forms a sealing interface between itself and a molded plastic enclosure body and between itself and an outer jacket of a heating cable. Cable ends are sealed within a sealed interior space of the enclosure body. A cup-shaped surface of a molded plastic part adjacently facing a congruent cone-shaped surface of the elastomeric grommet forms a slip-plane. The compression spring transfers energy to compress the elastomeric grommet and to cause it to expand radially against an interior wall of the enclosure body and against an outer jacket of the electrical cable and prevents that region of the grommet from becoming bonded over a high temperature operating interval to the inside wall of the enclosure body. When the sealing system cools down, the elastomeric grommet slips longitudinally along at least the slip-plane and thereby maintains a radial seal against the outer jacket of the heating cable.

16 Claims, 6 Drawing Sheets

HIGH TEMPERATURE SLIP-SEALING GROMMET SYSTEMS

BACKGROUND OF THE INVENTION

1. Field of the Invention

This invention relates to sealing systems for sealing an electrical cable against leakage from ambient. More particularly, the present invention relates to an improved high temperature slip-sealing grommet systems for preventing leakage at splices and cable ends of electrical cables such as heating cables over extended high temperature operating intervals and cool down periods.

2. Introduction to the Invention

The ends of elongate cables such as power cords or heating cables often must be sealed from the ambient in order to provide electrical insulation, environmental protection, leakage from an ambient fluid medium such as moisture or other liquids, and/or mechanical shielding. Many methods and devices have been used to provide a seal, including heat-recoverable tubing, end-caps, or boots; molded adhesive-filled boots; enclosures with gaskets or grommet seals; and wrapped tape. One example of a sealing device for an elongate heating cable is provided in the U.S. Pat. No. 5,792,987 entitled "Sealing Device", by the present inventor and others, the disclosure thereof being incorporated herein by reference.

The prior sealing methods and devices have not been entirely satisfactory, particularly for preventing leakage after the assembly has been subjected to high temperature over an extended operating interval, followed by a cool-down interval. One exemplary system illustrative of the prior art and this problem is the S-150-E trace heating cable splice kit offered commercially by the Raychem HTS division of Tyco Flow Control, a part of Tyco International Ltd. This kit 10 is shown in pertinent part in FIG. 1. Therein an electrical cable such as a trace heating cable is slipped through a pressure plate 12, a spring 14, a rigid compression ring 16, a silicone rubber grommet 18, and a back shim 20 before reaching an enclosed interior space of an enclosure body 22 wherein the cable end terminates or may be spliced to another cable end. The enclosure body 22 includes an annular shoulder projection inset from its opening which engages a peripheral region and thereby retains the back shim 20 against further axial displacement as the assembly is pushed into the enclosure body 22. While present, this projection is not shown in the FIG. 1 illustration. Screws 24 are used to drive the pressure plate inwardly towards the enclosure body 22, which compresses the spring 14 and grommet 18. In this example of the prior art, the spring 14 comprised a crest-to-crest five-turn, half-inch free height spring, such as a Smalley Spirawave™ C087-H3 spring having a theoretical spring rate (lbs/in) of 180. When compressed by force from the spring 14, grommet 18 expands radially against both the heating cable and an interior wall of the enclosure body 22 thereby nominally sealing the heating cable to the grommet 18, and the grommet to the enclosure body 22.

Silicone rubber is widely used as a high temperature elastomer. Although its mechanical properties are not unduly affected by exposure to high temperatures (temperatures above 200° C., for example), silicone rubber may adhesively bond at such high temperatures to certain engineering plastics such as polyphenylene sulfide (PPS). If a silicone rubber grommet, such as grommet 18, bonds to an enclosure body 22 formed of PPS, the grommet 18 is no longer free to move in response to applied stress and cannot continue to maintain a seal. This behavior has been noted in the S-150-E trace heating cable splice kit 10 illustrated in FIG. 1.

The process by which the splice kit 10 loses its seal is as follows. First, the seal kit 10 is assembled onto the heating cable and inserted into the enclosure body 22. The completed assembly is then subjected to a high temperature, e.g. in excess of 200° C. The assembly components expand in response to the high temperature. The volume thermal expansion coefficient of silicone rubber is about three times that of engineering plastics such as glass-filled PPS over the range of temperatures encountered in service. Consequently, the only direction for the silicone rubber grommet 18 to expand is longitudinally along the enclosure body 22 toward the pressure plate in the FIG. 1 example, because the grommet 18 is constrained longitudinally by the back shim and enclosure body but may move longitudinally toward the pressure plate 12 by further compression of the spring 14.

Over an extended time (hours or days) at the elevated temperature, the silicone rubber of the grommet 18 adhesively bonds to plastic parts like the PPS enclosure body 22, but does not adhere to the fluoropolymer outer jacket of the heating cable. When the assembly is later cooled to room temperature, the silicone rubber grommet 18 shrinks back to its original volume. However, because an outer annular surface of the grommet 18 has bonded to the enclosure body 22, the grommet 18 cannot shrink longitudinally. The only remaining dimension for the material to shrink is radially, and it does so, pulling away from the heating cable outer jacket, and forming a leakage path between the cable jacket and the grommet 18. This unwanted tendency to develop leakage paths has become increasingly acute in the face of modern industry-initiated uniform testing standards which now require testing of heating cables over extended times at temperatures in excess of 200° C.

Therefore, a hitherto unsolved need has developed and remains for a heating cable sealing kit which provides an assembly which does not develop leakage paths over time and when subjected to high temperature cycles.

SUMMARY OF THE INVENTION

A general object of the present invention is to provide a heating cable sealing kit and assembly for an electrical cable such as a heating cable which does not develop leakage paths over time-extended high temperature cycles and which can be made out of molded plastic and silicone rubber materials which withstand high temperatures.

Another object of the present invention is to provide a high temperature slip-seal grommet system which includes a slip-plane formed at adjacently confronting cone-cup shaped surfaces for more perfectly translating axial force into radial compression force and for permitting relative slippage of an elastomeric grommet along the slip-plane without becoming entirely axially bonded to an enclosure body over high temperature operational cycles and thereby preventing unwanted leakage at an interface with a heating cable jacket in a manner overcoming limitations and drawbacks of prior grommet systems and methods.

One more object of the present invention is to provide a kit of parts for assembly by a craft worker into a sealing system for sealing an end region of an elongate heating cable received through a central longitudinal opening, the kit of parts including a high temperature elastomeric grommet forming a slip-plane relative to a spring-loaded cup-shaped member.

The present invention comprises a seal kit forming a seal assembly for an elongate electrical cable such as a heating cable. The kit essentially includes a shaped elastomeric grommet, several molded plastic parts, and a compression spring. The compression grommet forms a sealing interface between itself and a molded plastic enclosure body and between itself and an outer jacket of a heating cable. Thus, electrically live ends of the cable can be effectively sealed within a sealed interior space of the enclosure body. A cup-shaped surface of a molded plastic part adjacently facing a congruent cone-shaped surface of the elastomeric grommet forms a slip-plane. The compression spring stores mechanical energy which is transferred to compress the elastomeric grommet and to cause it to expand radially against an interior wall of the enclosure body and against an outer jacket of the electrical cable. The cup-shaped surface slips over an outer region of the elastomeric grommet and prevents that region from becoming bonded over a high temperature operating interval to the inside wall of the enclosure body. When the assembly cools down, the elastomeric grommet is thereby permitted to shrink longitudinally by slippage along the slip-plane formed at the cup-shaped surface, thereby maintaining a radial seal against the outer jacket of the electrical cable.

Accordingly, an apparatus is provided for sealing an end region of an elongate cable such as a heating cable. The apparatus receives the heating cable through a central longitudinal opening, and includes an enclosure body of molded plastic material defining at least a first open end region leading to a fully-enclosed interior space for the cable end. The open end region of the body has a spring force stopping structure and defines an interior wall surface. A pressure plate formed of rigid material is releasably secured to cover and close the open end region of the body. A compression spring applies a longitudinal compression force between the pressure plate and the spring force stopping structure. A grommet formed of elastomeric material having a tendency to bond at high temperature with the material comprising the body but not to bond to material comprising an outer jacket of the heating cable, is compressed by the compression force. The grommet includes at least one generally cone-shaped face confronting a cup-shaped face of a structural member within a compression path between the pressure plate and the spring force stopping structure, thereby creating a slip-surface. The cup-shaped geometry of the member at the slip-surface prevents the grommet from becoming bonded over a high temperature operating interval to the inside wall of the body. When the assembly cools down, the elastomeric grommet is thereby permitted to shrink longitudinally by slippage along the slip-plane formed at the cup-shaped surface, thereby maintaining a radial seal against the outer jacket of the electrical cable.

In one aspect of the invention, the compression spring lies between the pressure plate and a rigid molded plastic shim forming the cup-shaped structural member. In another aspect of the present invention, the cup-shaped structural member is a shim of slippery plastic material imposed between the elastomeric grommet and a compression ring within the compression path. In one other embodiment of the invention, the cup-shaped structural member is integrally formed with the spring force stopping structure. In yet another embodiment of the invention, the spring force stopping structure is an end wall of the body opposite the open end, and the compression spring seats directly against the end wall and engages a rigid molded plastic shim forming the cup-shaped structural member.

These and other objects, advantages, aspects and features of the present invention will be more fully understood and appreciated by those skilled in the art upon consideration of the following detailed description of preferred embodiments, presented in conjunction with the accompanying drawings.

BRIEF DESCRIPTION OF THE DRAWINGS

The invention is illustrated in the accompanying drawings, in which.

DETAILED DESCRIPTION OF THE INVENTION

Figure 1:
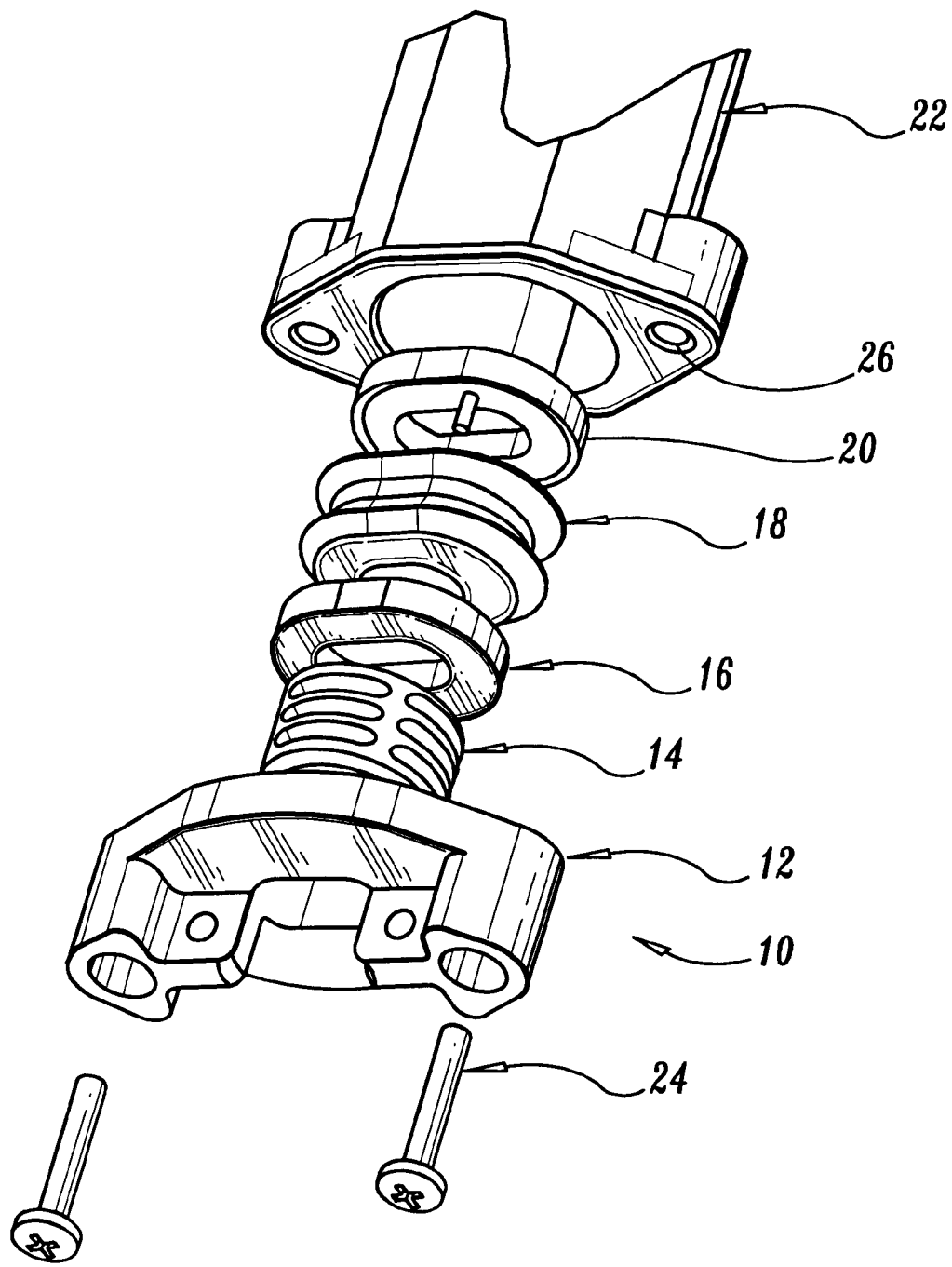
FIG. 1 is an exploded isometric view of sealing end portion of a sealing grommet system for preventing leakage at splices and cable ends of electrical trace heating cables in accordance with the prior art.
Figure 2:
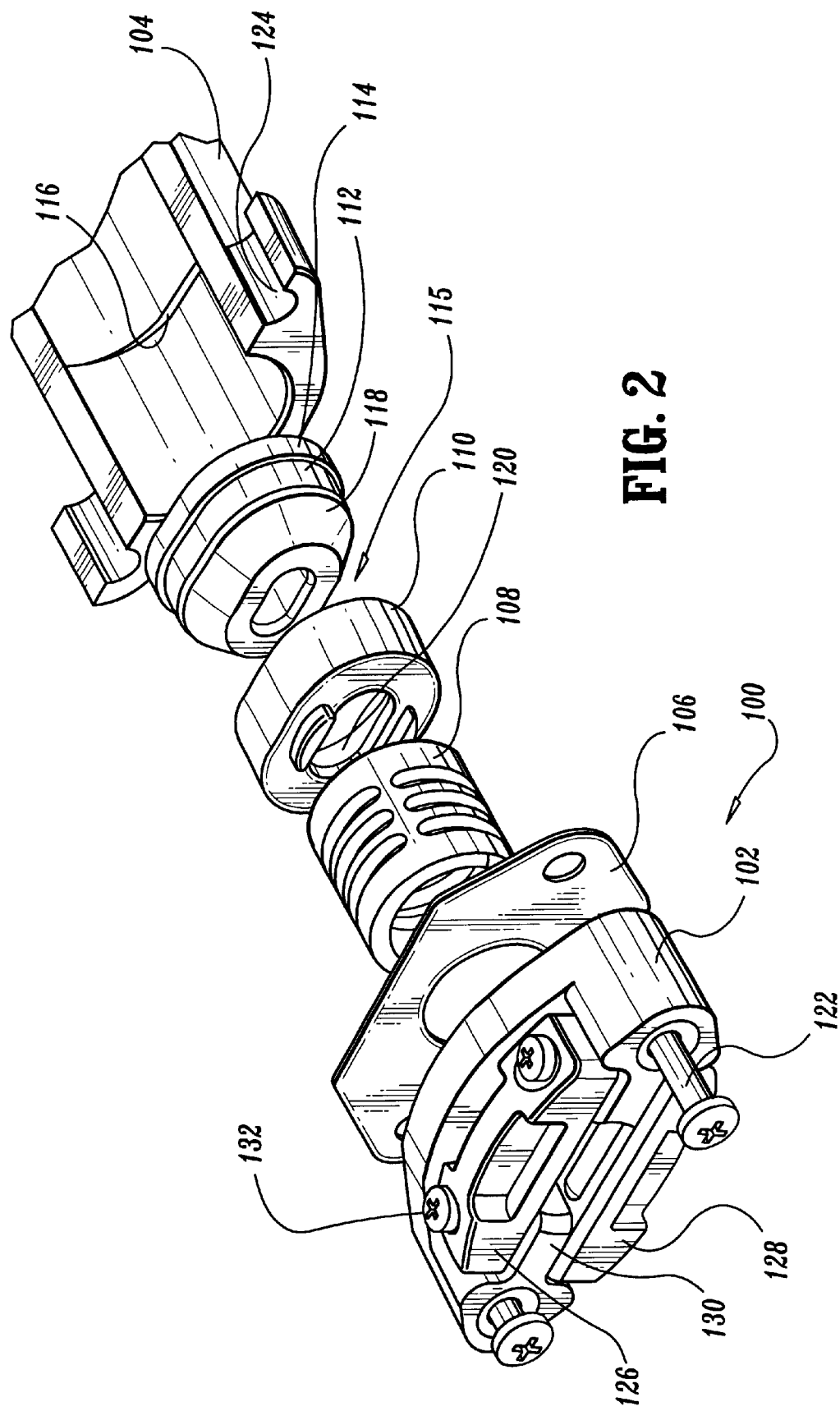
FIG. 2 is an axially-exploded isometric view of an end assembly of a high temperature slip-sealing grommet system for preventing leakage at splices and cable ends of electrical trace heating cables in accordance with principles of the present invention.
Figure 4:
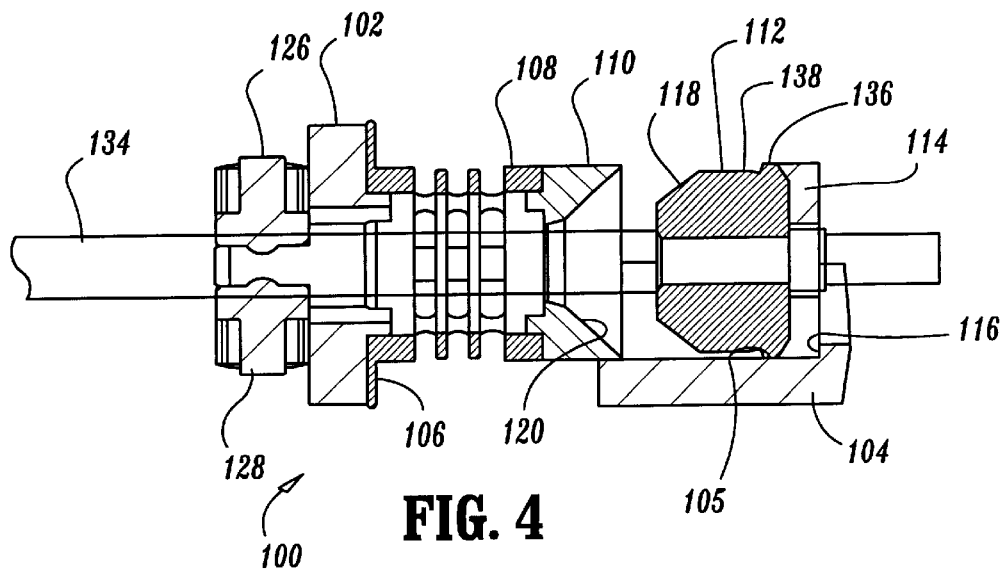
FIG. 4 is a view in elevation and section of the FIG. 2 assembly, taken along line 4—4 in FIG. 3.
Figure 3:
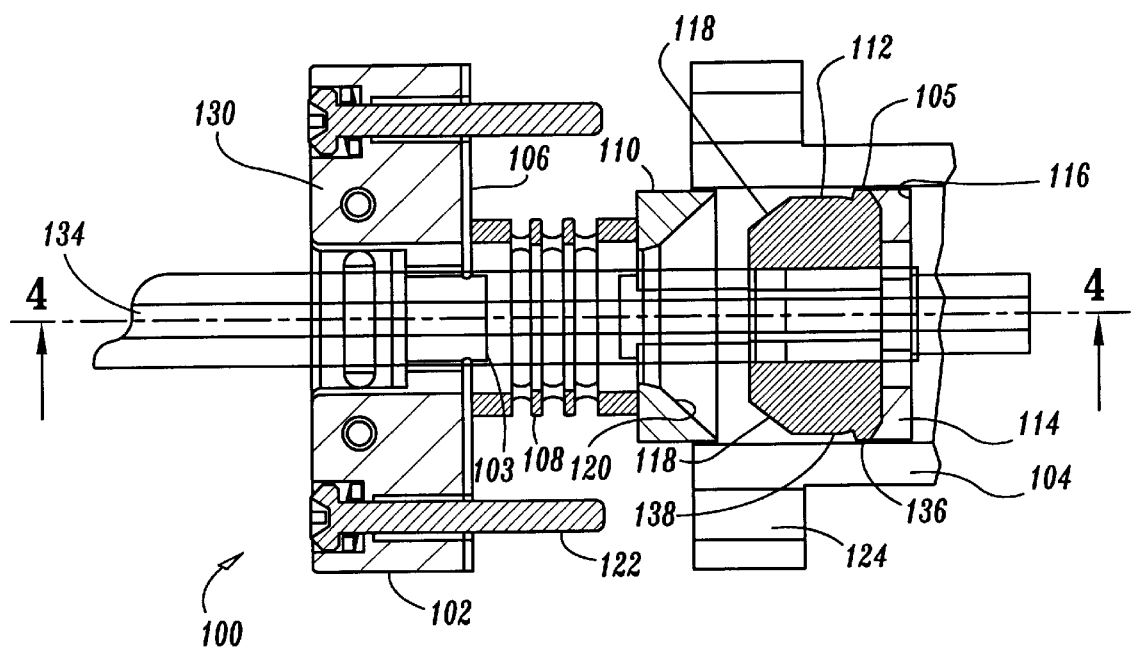
FIG. 3 is a plan view of the FIG. 2 high temperature slip-sealing assembly with portions broken away to show placement of the structural elements thereof.

As shown in FIGS. 2 through 7 one embodiment of a high temperature slip-sealing grommet system 100 incorporating principles of the present invention comprises an assembly including a pressure plate 102, an enclosure body 104, an impact plate 106, a spring 108, a cup-shaped compression ring 110, a cone-shaped elastomeric grommet 112, a rigid shim 114 which abuts a ledge 116 extending inwardly within an interior space of the enclosure body 104. Threaded screws 122 pass through sized openings in the pressure plate 102 and into threaded openings 124 of the enclosure body 104 in order to complete assembly of grommet system 100. A cable clamp comprising upper clamp plate 126, lower clamp plate 128 and ledges 130 of pressure plate 102 clamp the heating cable 134 securely to the pressure plate. Screws 132 extend through the upper clamp plate 126 and ledges 130, and thread into openings in lower clamp plate 128, in order to secure the cable clamp subassembly to the cable 134 and to the pressure plate 102.

In accordance with principles of the present invention, the cone-shaped elastomeric grommet 112 is molded of a heat cured silicone rubber elastomeric material such as a General Electric no-post-cure SE series material having heat-aged properties as follows: 43 Shore A; 938 tensile strength in psi; and, 379 elongation percentage. As molded the grommet 112 includes a generally cone-shaped surface 118 which directly confronts a cup-shaped surface 120 of the cup-shaped compression ring 110, thereby forming a slip-plane 115. As perhaps best seen in FIG. 4, the grommet 112 includes a relatively narrow annular peripheral ring region 136 adjacent the rigid shim 114 which forms a primary seal with a facing interior wall surface 105 of the enclosure body 104. A main cylindrical region 138 of the grommet 112 lies between the ring region 136 and the generally cone-shaped region 118 and the main region is slightly relieved or inset relative to the narrow ring region 136.

The cup-shaped compression ring 110 is molded of a non-adhering moldable material, preferably a perfluropolymer, such as Hyflon MFA 640 or MFA 680 produced by Ausimont. By providing a slip-plane 115 between the cone shaped surface 118 and the cup shaped surface 120, the grommet 112 slips relative to the compression ring 110 when axial force is applied by compression spring 108. The applied axial force is thereby converted more efficiently into radial force, and the portion of the grommet 112 engaging the cup-shaped surface 120 of the compression ring 110 is prevented from sticking to and bonding to the interior wall surface of the enclosure body 104 in a manner overcoming the limitations and drawbacks of the prior approach described hereinabove in connection with the FIG. 1 illustration.

The pressure plate 102, enclosure body 104, rigid shim 114, upper clamp 126 and lower clamp 128 are most preferably molded of a high temperature thermoplastic resin material, such as polyphenylene sulfide, which is capable of withstanding relatively high operating temperatures emitted from an elongate heating cable 134 (see FIG. 6) without deformation or decomposition. The impact plate 106 is preferably formed of a stainless steel having a thickness (e.g. 0.033 inch) sufficient to spread the force of compression spring 108 across a face of the pressure plate 102. The spring 108 is most preferably a crest-to-crest stainless steel flat wire compression spring, such as a Smalley Spirawave™ CS-087-H6 9-turn spring having a free height of 0.750 inch, 3.5 waves per coil and a theoretical spring rate (lbs/in) of 104. Following assembly of the system 100, this spring 108 is more heavily compressed and therefore applies a greater axial force than applied by the spring 14 of the prior system 10 shown in FIG. 1.

By interposing a compression ring 110 of non-adhering material, such as polytetrafluoroethylene (PTFE or Teflon™), between the spring 108 and the elastomeric grommet 112, the grommet is prevented from bonding to either the inside wall of the enclosure body 104 where the grommet is covered by the ring, or to the compression ring 110 itself Thus, the compression ring 110 is able to compress the grommet 112 and to convert axial spring force into radial (circumferential) compressive force around the perimeter of the heating cable 134. In this particular approach, a narrow annular part 136 of the grommet 112 is permitted to be in direct contact with a facing interior wall surface 105 of the enclosure body 104. Bonding of this narrow annular region 136 of the grommet to the PPS material of the facing interior wall surface 105 may occur at high temperatures and may improve the quality of the seal.

Sealing performance at high temperatures (such as 240° C.) is greatly improved by addition of the slip-plane 115 formed between the cup-shaped surface 120 of compression ring 110 and generally-cone-shaped surface 118 of the elastomeric grommet 112. In comparative testing, a version of the FIG. 1 conventional grommet system 10 was found to seal only for approximately 50–100 hours aging at 215° C., while an example of the FIGS. 2 to 7 grommet system 100 with the slip-plane 115 and a somewhat increased spring force was found to seal up to 589 hours at a higher operating temperature of 240° C.

Figure 5:
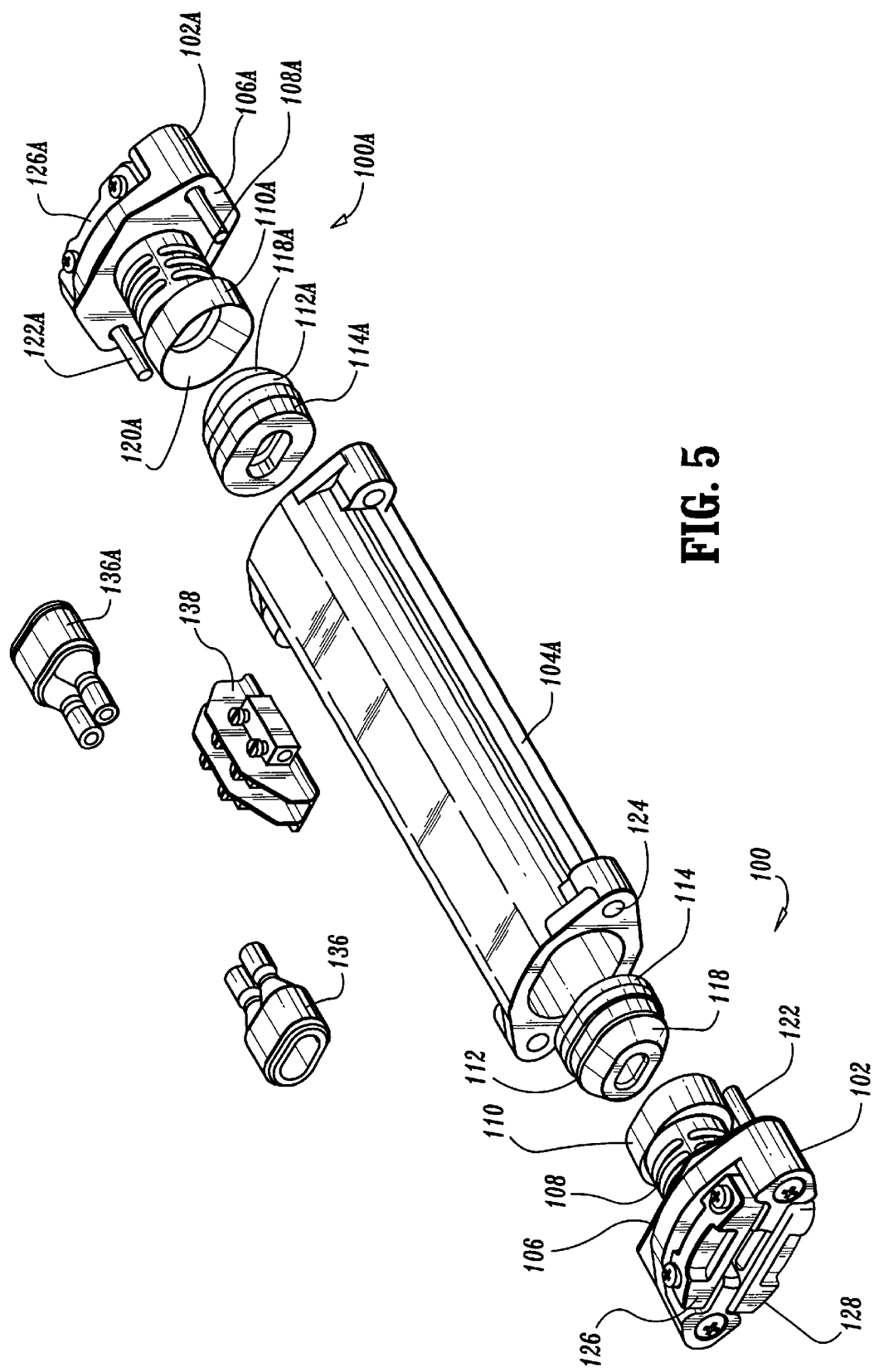
FIG. 5 is an exploded isometric assembly view of a cable sealing system having a FIG. 2 high temperature slip-sealing assembly at each end.
Figure 6:
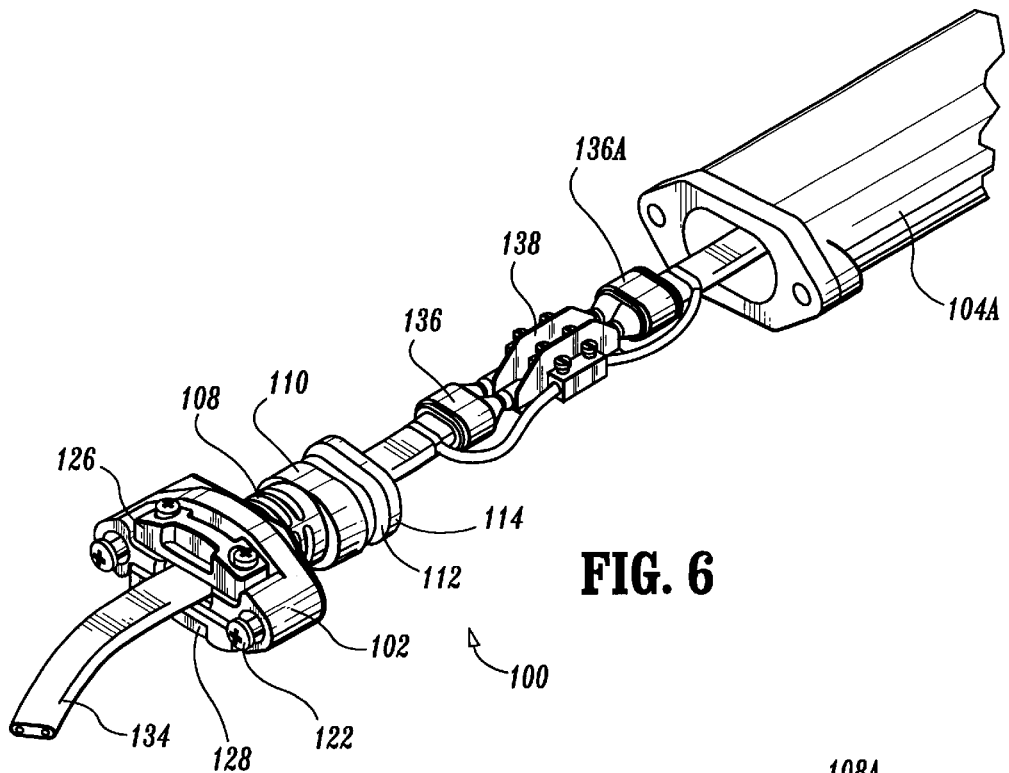
FIG. 6 is a diagrammatic isometric view of the FIG. 5 system showing use of the system in making a heating cable splice.
Figure 7:
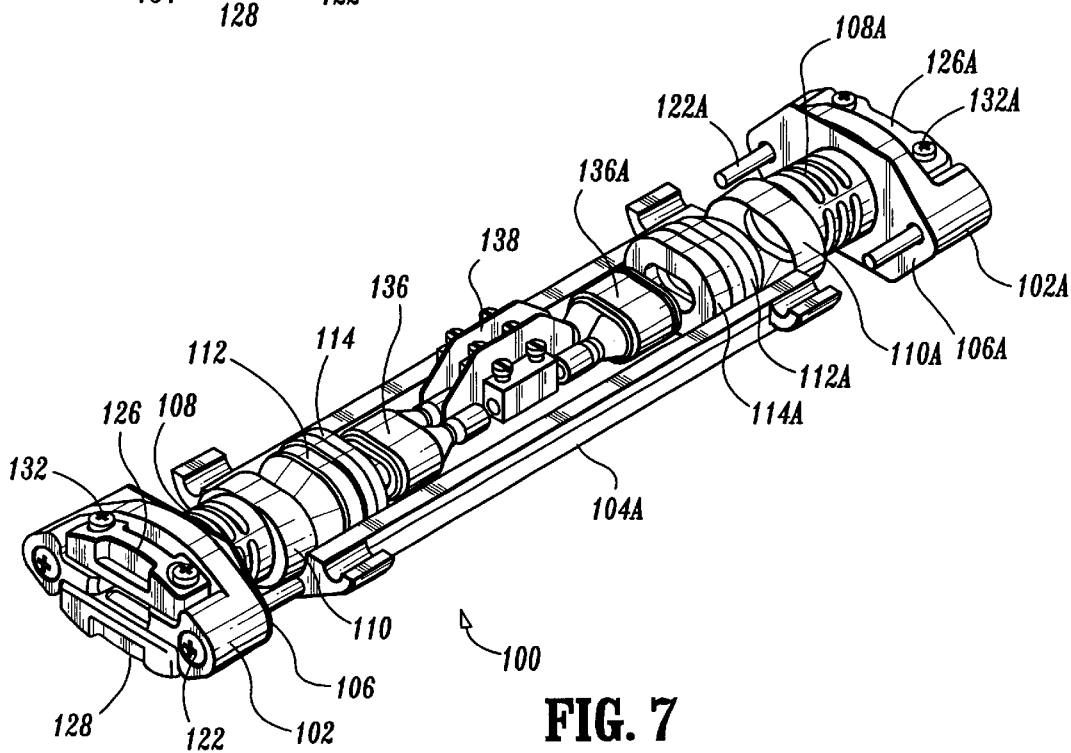
FIG. 7 is an exploded isometric view of the FIG. 5 system with a top half portion of the enclosure body removed to show an arrangement of internal components.

The enclosure body 104 alternatively may be formed of a non-adhering material such as PTFE, or a PTFE insert may be provided at the region of system 100. The PTFE insert may be molded or bonded to, or threaded onto, the inside wall of the end region of enclosure body 104 to prevent leakage, and provide a second, axial slip-plane relative to the elastomeric grommet 112. The enclosure body 104 may be configured to provide an end seal for the elongate heating cable 134, or it may form a container for a splice, as shown in FIGS. 5 to 7. Therein, the body 104A is elongated and has two slip-seal grommet systems 100 and 100A, wherein the elements of system 100A correspond directly to like elements of the system 100 and bear the same reference numerals with a suffix "A". Two molded cable insulators 136 slip over stripped ends of the heating cables to be joined. The stripped ends are then locked into contact pairs of a splice block 138, which also includes a contact pair for a ground braid of the heating cable (if present, as shown in FIG. 6, for example). Following assembly of the splice, the splice block 138 is moved to a central axial region of the interior space of enclosure body (FIG. 7) and each slip-seal grommet system 100, 100A is completed by threading screws 122, 122A into corresponding threads 124, 124A, thereby compressing spring 108, 108A and causing grommet 112 to engage the outer jacket of cable 134 and the facing interior wall 105 of enclosure body 104A.

Figure 8:
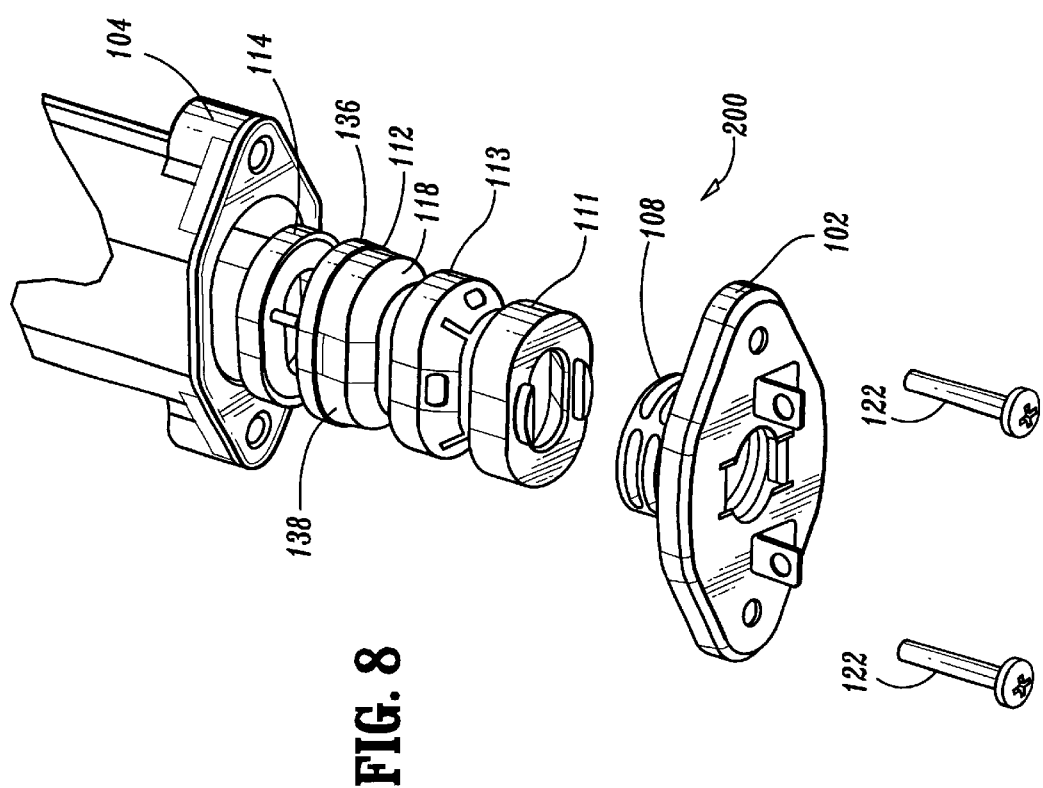
FIG. 8 is an axially-exploded isometric view of a sealing end portion of another high temperature sealing grommet system for preventing leakage at splices and cable ends of electrical trace heating cables in accordance with principles of the present invention; and, FIG. 9 is a view in elevation and section of a further high temperature sealing grommet system for preventing leakage at splices and cable ends of electrical trace heating cables in accordance with principles of the present invention.

FIG. 8 illustrates an alternative high temperature slip-sealing grommet system 200 in which the compression ring 110 has been replaced with a cone-cup-shaped ring 111 formed of suitable high temperature plastic such as PPS and a thin shaped slip-plane member 113 formed of a non-adhering moldable material, preferably similar to the perfluoropolymer used to form the compression ring 110. The cone-cup-shaped member 111 uses less material than the compression ring 110, and thereby achieves some incremental cost savings, since perfluoropolymer materials tend to be relatively expensive. Otherwise, the system 200 is the system 100, and the same explanations given for the system 100 apply to the same elements found in the system 200 which have the same reference numerals as applied to elements of the system 100.

Figure 9:
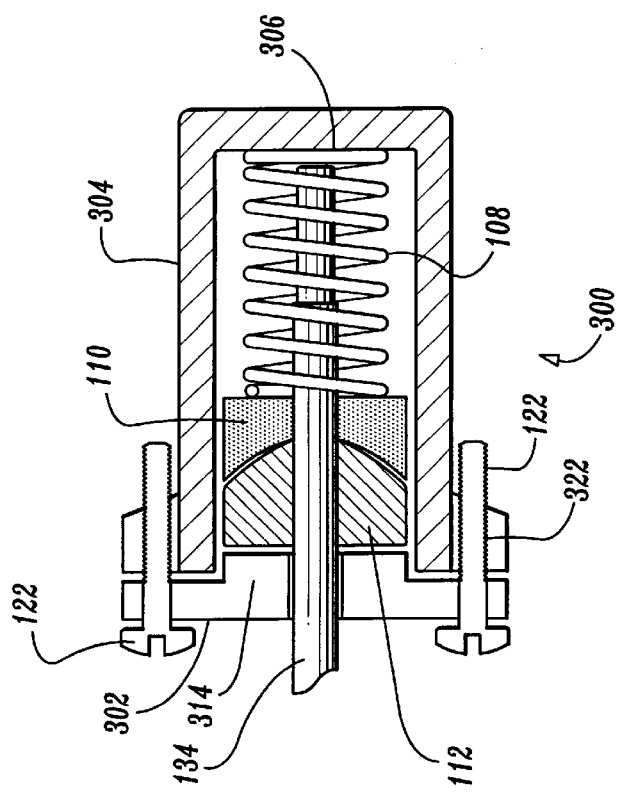

FIG. 9 illustrates another preferred embodiment of the present invention, particularly for cable end seals where there is no need for a splice block. In the slip-sealing grommet system 300 a housing 304 includes a distal wall 306 which is opposite an opening closed by a pressure plate 302. The spring 108 seats at one end against an inside surface of wall 306 and applies compressive force to compression ring 110 which is placed onto an end of cable 134 oppositely of the orientation used in the FIGS. 2 to 7 system 100. Elastomeric grommet 112 is also placed oppositely onto the cable end. The pressure plate 302 defines an outer shim region 314 which bears against the reversed grommet 112 when the pressure plate 302 is attached to the body 304 via screws 122 and threaded openings 324.

Those skilled in the art will appreciate that many other changes, alternatives and modifications will become readily apparent from consideration of the foregoing descriptions of referred embodiments without departure from the spirit of the present invention, the scope thereof being more particularly pointed out by the following claims. The descriptions herein and the disclosures hereof are by way of illustration only and should not be construed as limiting the scope of the present invention.

What is claimed is:

1. Apparatus for sealing an end region of an elongate heating cable received through a central longitudinal opening, and comprising:

an enclosure body of molded plastic material defining at least a first open end region leading to a fully-enclosed interior space for a cable end, and defining a spring force stopping structure and an interior wall surface within the interior surface of said body, a pressure plate formed of rigid material releasably securable to the body to cover and close the open end region, a compression spring for applying a longitudinal compression force along a force path between the pressure plate and the spring force stopping structure, a grommet within the force path and formed of elastomeric material having a tendency not to bond to material comprising an outer jacket of a heating cable and having at least one generally cone-shaped face, and a structural member within the force path and defining a cup-shaped face congruent with and confronting the generally cone-shaped face of the grommet for transferring the compression force to the generally cone-shaped face, thereby forming a slip-surface between the member and the grommet and preventing the grommet from becoming bonded over a high temperature operating interval to the inside wall of the body and, when cooled, permitting the grommet to shrink longitudinally by slippage along the slip-surface formed at the cup-shaped surface, thereby maintaining a radial seal against the outer jacket of an electrical cable.

2. The slip-seal apparatus set forth in claim 1 wherein the compression spring lies between the pressure plate and a rigid molded plastic shim forming a cup-shaped structural member.

3. The slip-seal apparatus set forth in claim 1 wherein the cup-shaped structural member is a cone-cup-shaped shim of slippery plastic material imposed between the grommet and a compression ring within the force path.

4. The slip-seal apparatus set forth in claim 1 wherein the cup-shaped structural member is integrally formed with the spring force stopping structure as an integral part of the enclosure body.

5. The slip-seal apparatus set forth in claim 1 wherein the spring force stopping structure is an end wall of the body opposite the open end, and the compression spring seats directly against the end wall and engages a rigid molded plastic shim forming the cup-shaped structural member for transferring compression force to the generally cone-shaped face of the grommet.

6. The slip-seal apparatus set forth in claim 1 further comprising a spring-force distributing impact plate between the pressure plate and the compression spring.

7. The slip-seal apparatus set forth in claim 1 wherein the elastomeric material comprises silicone rubber and wherein the enclosure body comprises a molded polyphenylene sulfide material and wherein the grommet has a tendency to bond over high temperature to the material comprising the body.

8. The slip-seal apparatus set forth in claim 1 wherein at least a portion of the interior wall surface within the interior surface of the body confronted by the grommet comprises a non-adhering fluoropolymer material.

9. The slip-seal apparatus set forth in claim 1 comprising a first slip-seal apparatus at a first end of the body forming a heating cable splice container having the first end and a second end like the first end, the first and second ends for receiving ends of heating cables to be spliced together, and further comprising splice block means for securing and electrically connecting ends of conductors of said heating cables, and further comprising a second slip-seal apparatus as defined in claim 1 at the second end of a container.

10. An apparatus for sealing an end region of an elongate heating cable comprises:

a housing of rigid material defining at least a first open end region leading to a fully-enclosed interior space, the open end region having a retaining shoulder and an interior wall surface, a back shim of rigid material having a back face retained by the retaining shoulder, having a front face forming an anvil surface, and defining a central opening sized to receive therethrough the end region, an elastomeric grommet having a flat face confronting the anvil surface, having a generally cone-shaped face axially opposite the flat face, and defining a central opening sized to receive therethrough the end region, a front shim of rigid material having a generally cup-shaped grommet-confronting face congruent with and confronting the generally cone-shaped face, having a generally flat spring-engaging face, and defining a central opening for receiving therethrough the end region, a compression spring for applying an axial sealing force to the front shim and defining an axial opening enabling the end region to pass therethrough, and, a pressure plate of rigid material releasably secured to said housing to close said open end region, the pressure plate including a spring base for the compression spring and defining an axial opening enabling the end region to pass therethrough, whereby the pressure plate, when secured to the housing, applies an axial force driving the front shim into the elastomeric grommet, and the axial force along with relative slippage between the generally cup-shaped grommet-confronting face and the generally cone-shaped face, causes the elastomeric grommet to compress and expand radially against the interior wall surface and an adjacent outer surface of the end region and to result in a radial seal against the outer jacket of the heating cable over high temperature operating cycles.

11. The apparatus set forth in claim 10 wherein the elastomeric grommet comprises molded silicone rubber and wherein the housing comprises a molded polyphenylene sulfide material and wherein the grommet has a tendency to bond over high temperature to the material comprising the housing.

12. The apparatus set forth in claim 10 comprising a first apparatus at a first end of the housing forming a heating cable splice container having the first end and a second end like the first end, the first and second ends for receiving ends of heating cables to be spliced together, and further comprising splice block means for securing and electrically connecting ends of conductors of said heating cables, and further comprising a second apparatus as defined in claim 9 at the second end of the container.

13. A kit of parts for assembly by a craft worker into a sealing system for sealing an end region of an elongate heating cable received through a central longitudinal opening, the kit of parts comprising:

an enclosure body of molded plastic material defining at least a first open end region leading to a fully-enclosed interior space for the cable end, and defining a spring force stopping structure and an interior wall surface within the interior surface of said body, a pressure plate formed of rigid material releasably securable to the body to cover and close the open end region, attachment means for attaching the pressure plate to the open end region of the enclosure body during assembly of the kit to form the system, a compression spring for applying a longitudinal compression force along a force path between the pressure plate and the spring force stopping structure, a grommet within the force path and formed of elastomeric material having a tendency not to bond to material comprising an outer jacket of the heating cable and having at least one generally cone-shaped face, and a structural member within the force path and defining a cup-shaped face congruent with and confronting the generally cone-shaped face of the grommet for transferring the compression force to the generally cone-shaped face upon assembly of the kit to form the system, thereby forming a slip-surface between the member and the grommet and preventing the grommet from becoming bonded over a high temperature operating interval to the inside wall of the body and, when cooled, permitting the grommet to shrink longitudinally by slippage along the slip-surface formed at the cup-shaped surface, thereby maintaining a radial seal against the outer jacket of the electrical cable.

14. The kit of parts set forth in claim 13 wherein the attachment means comprises a plurality of screws passing through openings defined by the pressure plate and threading into threaded openings of the first open end region respectively aligned with the openings of the pressure plate.

15. The kit of parts set forth in claim 13 wherein the grommet comprises molded silicone rubber and wherein the body comprises a molded polyphenylene sulfide material and wherein the grommet has a tendency to bond over high temperature to the material comprising the body.

16. The kit of parts set forth in claim 13 comprising upon assembly a first sealing system at a first end of the body forming a heating cable splice container having the first end and a second end like the first end, the first and second ends for receiving ends of heating cables to be spliced together, and further comprising splice block means for securing and electrically connecting ends of conductors of said heating cables, and further comprising a second kit of parts as defined in claim 12 for assembly into a second sealing system at the second end of the container.

* * * * *